Figure 1:
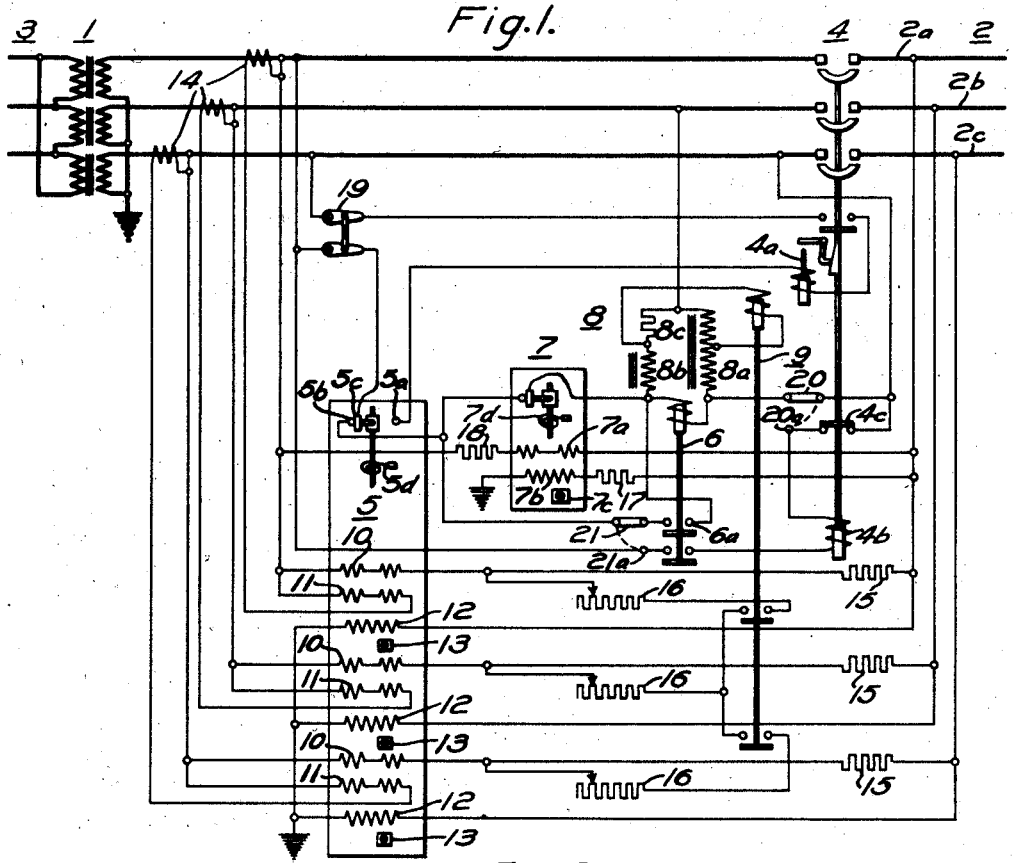

April 24, 1934.  M. A. BOSTWICK  1,955,940

NETWORK PROTECTOR

Filed Aug. 25, 1932

WITNESSES:
P. J. Fitzgerald
Geo. O. Harrison

INVENTOR
Myron A. Bostwick.
BY
ATTORNEY

Patented Apr. 24, 1934

1,955,940

UNITED STATES PATENT OFFICE 1,955,940

NETWORK PROTECTOR

Myron A. Bostwick, North Arlington, N. J., assignor to Westinghouse Electric & Manufacturing Company, East Pittsburgh, Pa., a corporation of Pennsylvania Application August 25, 1932, Serial No. 630,356

11 Claims. (Cl. 175—294)

My invention relates to protective apparatus for use in distribution systems and particularly to automatic protectors for controlling the connection and disconnection of power circuits in response to electrical conditions thereof.

More particularly, my invention relates to network protectors of the type disclosed in the copending application of John S. Parsons, Serial No. 627,083, filed July 30, 1932, and assigned to the Westinghouse Electric & Manufacturing Company. In the copending application mentioned above, there is disclosed an automatic network protector in which provision is made for increasing the sensitiveness of operation of the protector during fault conditions of the power system to which the protector is applied. As explained in the above-mentioned application, the phasing windings of the master relay, which are ordinarily used in the reclosing operation of the protector to compare the relative magnitudes and phase position of the voltages on either side of the protector circuit breaker, are also used as restraining windings to cause insensitive operation of the master relay when the circuit breaker is closed and circuit conditions are normal. In addition to the master relay, a second fault responsive relay, preferably responsive to a positive symmetrical component of polyphase voltage, is used to open-circuit, short-circuit or otherwise modify the connections of the phasing windings during fault conditions, to thereby cause sensitive operation of the master relay.

Although the protector disclosed in the above-mentioned application is reliable and satisfactory, it is subject to the disadvantage that contact members are required for opening each of the phasing circuits and for closing each of the restraining circuits to obtain a restraining torque and for opening the restraining circuits and closing the phasing circuits to obtain phasing operation of the master relay. Because of the large number of contact members required for this purpose, the protector wiring is complicated and the possibility of faulty operation is greater than it would be if the wiring were less complicated.

It is accordingly an object of my invention to provide an improved protector of the type indicated above, in which novel restraining circuits shall be provided which shall require a minimum number of controlling contact members.

Another object of my invention is to provide a novel protector of the type indicated above in which the phasing windings or other windings of the master relay may be energized to produce a biasing or restraining torque, without interruption of the phasing circuits.

A further object of my invention is to provide a novel protector in which the power-directional master relay shall operate in the same manner as a separate phasing relay to prevent closure of the protector circuit breaker except when the feeder voltage leads the network voltage or bears some other relationship thereto such that reverse power will not flow under average impendance conditions of the network.

Other objects of my invention will become evident from the following detailed description taken in conjunction with the accompanying drawing in which Figure 1 is a diagrammatic view of an automatic protector embodying my invention.

Figure 2:
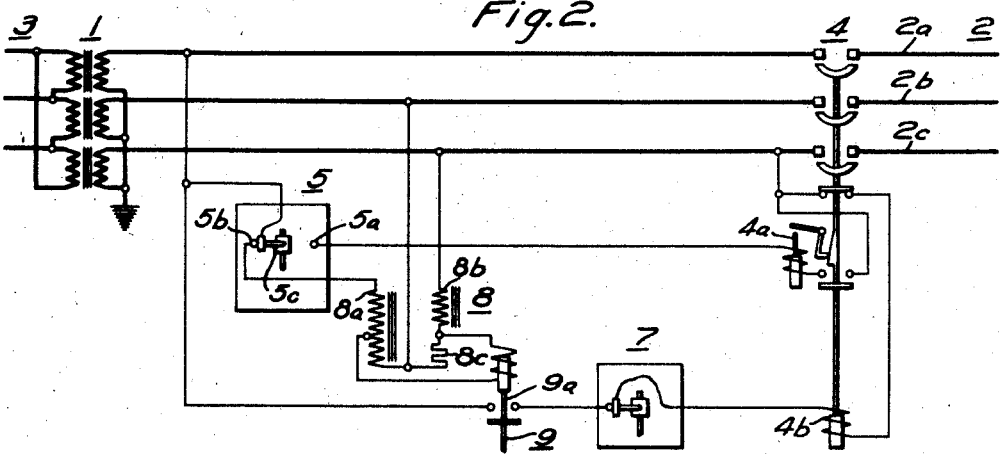

Fig. 2 is a diagrammatic view of the control circuits for a modification of the protector shown in Fig. 1.

Referring to Fig. 1 in detail, a transformer bank 1, which may be one of a number of similar banks for supplying power to a distribution network 2, is connected between a feeder 3 and one side of a protector circuit breaker 4. I have illustrated the primary windings of the transformer bank 1 connected in delta to the feeder 3 and the secondary windings connected in star with neutral grounded, but it will be understood that my invention may be practiced with other connections known in the art. The circuit breaker 4 is connected between the secondary windings of the transformer bank 1 and the conductors 2a, 2b and 2c of the network 2.

The circuit breaker 4 is provided with a trip mechanism of any suitable type, which I have illustrated as a shunt trip coil 4a, and with a closing motor or coil 4b. The trip coil 4a is controlled by means of a tripping contact member 5a and a movable contact member 5c of a power-directional master relay indicated diagrammatically at 5. The closing coil 4b of the circuit breaker 4 is controlled by means of a closing relay 6.

The operating coil of the closing relay 6 is connected in a circuit which includes a closing contact member 5b of the relay 5, and contact members of a phasing relay 7. In addition to contact members for controlling the closing coil 4b of circuit breaker 4, the closing relay 6 is provided with a set of contact members 6a for completing a holding circuit for itself independent of the phasing relay 7.

A phase sequence voltage network 8, is connected to be energized in accordance with the polyphase secondary terminal voltage of the transformer bank 1 when the operating coil of the closing relay 6 is energized. Two terminals of the phase-sequence network 8 are connected directly across the operating coil of closing relay 6 to be energized by two phases of the secondary voltage of transformer bank 1 when the closing contact members of the power directional relay 5 and the contact members of the phasing relay 7 are closed. The remaining terminal of the phase-sequence network 8 is connected to the secondary terminal of the transformer bank 1 corresponding to the remaining phase of the three-phase transformer connections shown.

A voltage responsive relay 9 for controlling a set of restraining connections for the power-directional relay 5, as will be hereinafter more fully described, is connected to output taps of the phase-sequence network 8 to respond to a positive symmetrical voltage component.

The phase-sequence network 8 is preferably of the type disclosed in the copending application of B. E. Lenehan, Serial No. 613,583, filed May 25, 1932 and assigned to the Westinghouse Electric & Manufacturing Company. This network comprises an auto-transformer 8a, having a tap to provide a voltage less than half the total voltage impressed on the auto-transformer, for example a 40% tap, and a reactor 8b and a resistor 8c having a combined lagging phase angle of 60°. Assuming that the phase rotation of the secondary voltages of the transformer bank 1 is as indicated by the subscripts a, b and c of the network conductors 2a, 2b and 2c, the coil of the voltage responsive relay 9 is subject to a voltage equal to the vector sum of 40% of the voltage between the b and c phase transformer secondary terminal and a voltage equal to 40% of the voltage between the a and b phase transformer secondary terminals but lagging the latter voltage by a phase angle of 60°. As explained in the above-mentioned application of B. E. Lenehan, with such connections, the voltage responsive relay 9 responds to a positive symmetrical component of the polyphase voltage applied to the phase-sequence network.

The voltage-responsive relay 9 is designed to close when the positive symmetrical components of transformer secondary voltage exceed a predetermined value, for example, 95% of the normal balanced network voltage, and to drop out when the positive symmetrical components fall below a predetermined minimum value, for example 85% or 90% of the normal balanced network voltage.

The closing relay 6 is so designed that it will close when energized through the closing contact members of relays 5 and 7 but will not close nor be held closed by the comparatively low voltage which may be applied to its operating coil from the phase-sequence network 8.

The power directional relay 5 is preferably of the polyphase induction-disc type described in the co-pending application of John S. Parsons mentioned above, and is provided with three independent driving magnets (not shown), upon each of which are mounted a pair of phasing windings 10, a pair of current windings 11 and a potential winding 12, in a well known manner.

The power-directional relay 5 is provided with a spring 5d for biasing the movable contact member 5c into engagement with the closing contact member 5b when the potential windings 12 are deenergized. An over-voltage adjusting loop indicated diagrammatically at 13 is associated with each of the potential windings 12 to overcome the biasing torque of the spring 5d and bias the movable contact member 5c out of engagement with the closing contact member 5b, when the potential windings 12 are energized, as explained in the copending application of John S. Parsons, mentioned above.

The current windings 11 of the relay 5 are connected to be energized by means of a set of current transformers 14 in accordance with the phase currents of the secondary windings of the transformer bank 1.

The phasing windings 10 of the relay 5 are connected in series with suitable phasing impedance elements 15, which I have illustrated as phasing resistors, across the main contact members of the circuit breaker 4.

The potential windings 12 of the relay 5 are connected between the corresponding phase conductors 2a, 2b and 2c of the network 2 and ground, to respond to the network star voltages in the usual manner.

The three groups of current windings 11 and potential windings 12 are connected in such relative directions that when balanced power flows from the transformer bank 1 to the distribution network 2, the torque of each group tends to maintain engagement of the movable contact member 5c and the closing contact member 5b. When balanced power flows from the network 2 to the transformer bank 1, the torque produced by each of the groups of current and potential windings tends to rotate the movable contact member 5c out of engagement with the closing contact member 5b and into engagement with the tripping contact member 5a.

The phasing windings 10 are connected in such relative directions, as compared with the potential windings 12, that when the circuit breaker 4 and the voltage responsive relay 9 are open and the distribution network 2 is energized from other transformer banks (not shown), the torque of each of the groups of potential and phasing windings tends to cause engagement of the movable contact member 5c and the closing contact member 5b if the transformer secondary voltage is in phase with the network voltage and exceeds the network voltage by more than a predetermined amount, such as a fraction of a volt. If the component of transformer secondary voltage in phase with the network voltage fails to exceed the network voltage by the predetermined amount mentioned above, the movable contact member 5c of the relay 5 is maintained out of engagement with the closing contact member 5b.

The restraining connections for the power-directional relay 5, mentioned above, comprise impedance elements 16 which I have illustrated as adjustable resistors, connected between the junction points of the phasing windings 10 and the corresponding phasing resistors 15, and an artificial neutral point formed by the contact members of the voltage responsive relay 9. It will be noted that upon closure of the voltage responsive relay 9, a three-phase potentiometer is formed for applying a voltage component to each of the phasing windings 10.

The phasing relay 7 is preferably of the single element induction disc type. The windings of this relay comprise a pair of phasing windings 7a and a potential winding 7b, mounted upon a driving magnet (not shown) in the usual manner. A pair of impedance elements 17 and 18, which I have illustrated as resistors, are included in the phasing and potential circuits of the phasing relay 7, for rotating the closing characteristic of the relay counter-clockwise through an angle approaching 90°, in a well known manner to provide anti-pumping characteristics. The phasing relay 7 is provided with a spring 7d and an over-voltage adjusting loop 7c for the same purpose as the corresponding elements of the power-directional relay 5.

A manually operated switch 19 is provided for opening the control circuits of the protector for testing. A pair of conducting links 20 and 21 are provided for establishing insensitive connections of the protector, as will be hereinafter more fully explained.

The operation of the apparatus shown in Fig. 1 may be set forth as follows. It is assumed that initially the distribution network 2 and the feeder 3 are deenergized and the various relays and switches of the protector are in the positions shown in the figure.

If the feeder 3 is first energized, the transformer bank 1 develops a secondary voltage but as the circuit breaker 4 is open no current flows in the secondary windings of the transformer bank 1. The voltage of each phase of the secondary windings of the transformer bank 1 is now impressed on a circuit which includes the phasing winding 10 for the corresponding phase, a phasing resistor 15 and the corresponding potential winding 12. If no translating devices are connected to the dead network 2, the current in each of the phasing windings 10 is in phase with the current in the corresponding potential winding 12, and no torque is exerted in the relay 5 because of the quadrature space displacement of the phasing and potential windings. If any translating devices are connected to the dead network 2, they act as a short-circuit for the comparatively high impedance potential windings 12 and in this way prevent the relay 5 from developing an appreciable torque. In either case, therefore, the biasing spring 5d acts unopposed to maintain engagement of the movable contact member 5c and the closing contact member 5b of the relay 5. Similar considerations apply to the phasing relay 7, and the biasing spring 7d of the latter relay maintains engagement of the phasing relay contact members.

As the closing contact members of the power directional relay 5 and the contact members of phasing relay 7 are now closed, circuits for the closing relay 6 and for the phase-sequence network 8 are completed.

The closing relay 6 closes to complete a holding circuit for itself through its contact members 6a and to complete a circuit for the closing coil 4b of the circuit breaker 4.

If the positive symmetrical components of the secondary voltage of the transformer bank 1 now exceed 95% of the normal balanced network voltage, as would be the case under normal supply voltage conditions, the voltage-responsive relay 9 closes to complete restraining connections for the power-directional relay 5. A voltage is now applied to each of the phasing windings 10 because of the potentiometer connection of the windings 10 and the resistors 15 and 16 between the secondary terminals of transformer bank 1 and the artificial neutral point formed by the contact members of relay 9. Because of the energization of phasing windings 10 in this manner, a biasing or restraining torque is exerted in the power directional relay 5 which maintains the movable contact member 5c firmly in engagement with the closing contact member 5b.

In response to energization of the closing coil 4b of the circuit breaker 4 by the closing relay 6, as mentioned above, the circuit breaker 4 closes and is latched in. The circuit breaker 4, in closing, energizes the network 2 and the potential windings 12 of the relay 5 and 7b of the phasing relay 7. Upon energization of the potential winding 7b, the over-voltage adjusting loop 7c acts to produce a biasing torque in the phasing relay 7 which overcomes the torque of the spring 7d and causes the contact members of relay 7 to open. As the relay 5 is subject to a restraining torque however, and as the current windings 11 are now effective, the same action does not occur in relay 5.

The relay 5 now acts as a power-directional relay with insensitive setting. By adjusting the resistors 16, the restraining torque produced in the relay may be adjusted to suit the requirements of the application in which the protector is used.

If a fault occurs on the network 2, it is burned clear in the usual manner. If, because of a network fault comparatively close to the circuit breaker 4, the voltage at the protector is reduced to such a value that the voltage-responsive relay 9 drops out, the circuit breaker 4 nevertheless remains closed because the direction of power flow is normal.

If a fault occurs on the feeder 3, the direction of power flow reverses and a considerable reduction of voltage of one or more phases occurs, depending upon the nature of the fault. In response to the reduction of voltage, the positive symmetrical components of network voltage decrease and the voltage-responsive relay 9 drops out to interrupt the restraining connections. The relay 5 now operates with maximum sensitivity, and in response to the reverse power flow, operates to cause engagement of the movable contact member 5c and the tripping contact member 5a.

In response to engagement of the contact members 5c and 5a, the shunt trip coil 4a is energized and the circuit breaker 4 trips open.

Assuming that the network 2 is now energized by other transformer banks not shown, the potential windings 12 of the relay 5 and 7b of the relay 7 remain energized. As soon as the feeder breaker (not shown) opens to disconnect the feeder 3 at the supply end, the voltage of the network 2 is impressed on the circuits of the phasing windings 10. The phasing windings 10 now-cooperate with the potential winding 12 to produce a strong torque which maintains the movable contact member 5c in engagement with the tripping contact member 5a. The over-voltage adjusting loops 13 also produce a torque which tends to maintain the movable contact member 5c in engagement with the tripping contact member 5a until normal voltage of the transformer bank 1 is restored. Similarly, the contact members of the phasing relay 7 firmly held in the open position.

When the fault on feeder 3 has cleared or the feeder has been repaired, and the feeder voltage has been restored, the transformer bank 1 develops a secondary voltage. When the component of transformer secondary voltage in phase with the network voltage exceeds the network voltage by at least the predetermined amount mentioned above, the movable contact member 5c of the relay 5 moves into engagement with the closing contact member 5b. If the transformer secondary voltage now falls within the range of closing voltages of the phasing relay 7, which condition would be satisfied for ordinary adjustments of the phasing relay if the transformer secondary voltage leads the network voltage, the phasing relay 7 also closes. The closing relay 6 now operates to initiate a closing operation of the circuit breaker 4 in the manner previously described.

Although the insensitive operation of the protector with automatic change to sensitive operation under fault conditions as described above, is preferable in many applications, it may be desirable in some cases to operate the protector without the insensitive feature.

To cause sensitive operation of the protector shown in Fig. 1 under all conditions, the conducting links 20 and 21 are unfastened at one end, rotated through the arcs indicated by dotted lines and secured to the studs 20a and 21a respectively. When the latter connections are made, the holding circuit for the closing relay 6 is independent of both the power-directional relay 5 and the phasing relay 7. The c-phase return connection of the phase-sequence network 8 and the closing relay 6, also, now includes back contact members 4c of the circuit breaker 4.

The operation of the protector of Fig. 1 with sensitive connections is the same as that heretofore described, except that upon closure of the circuit breaker 4, the back contact members 4c open to disconnect the closing relay 6 and one terminal of the phase-sequence network 8. The power-directional relay 5 accordingly operates without restraining torque during normal conditions and also during fault conditions.

Fig. 2 shows the control circuits for a modified form of protector in which the circuit breaker can close only when the transformer secondary voltage exceeds a predetermined value. Referring to Fig. 2, the current, phasing and potential windings of relay 5 and the phasing and potential windings of the relay 7, together with their associated connections, which are in all respects identical with the corresponding elements of Fig. 1, have for simplicity been omitted. The overvoltage adjusting loops and springs of the relays 5 and 7, corresponding to the elements 13 and 5d of relay 5 and 7c and 7d of relay 7 of Fig. 1, have for simplicity also been omitted. The elements shown are designated by the same reference numerals as the corresponding elements of Fig. 1.

In the Fig. 2 modification, a terminal of the phase sequence network 8 is controlled by the closing contact members of the power-directional relay 5, and the closing circuit of the circuit breaker 4 is controlled by the contact members of the phasing relay 7 and auxiliary contact members 9a of the voltage responsive relay 9.

The operation of the protector shown in Fig. 2 is similar to that heretofore described in connection with Fig. 1, except that automatic closure of the circuit breaker 4 can occur only when the following conditions are satisfied: (1) positive symmetrical components of transformer secondary voltage exceed a predetermined value for example 95% of normal balanced network voltage and (2) either the network 2 is dead or (3) the transformer secondary voltage and network voltage are of proper relationship to cause closure of both the power-directional relay 5 and the phasing relay 7. In other words, in addition to the closing requirements of the protector shown in Fig. 1, the Fig. 2 modification also requires that the transformer secondary voltage exceed a predetermined absolute value. The protector shown in Fig. 2 has the advantage that closure of the protector breaker is prevented when, because of a fault in a remote part of the system or other abnormal condition, both the feeder voltage and network voltage are reduced below normal value.

I do not intend that the present invention shall be restricted to the specific structural details, arrangement of parts or circuit connections herein set forth, as various modifications thereof may be effected without departing from the spirit and scope of my invention. I desire therefore, that only such limitations shall be imposed as are indicated in the appended claims.

I claim as my invention:

1. In an automatic protector for controlling a polyphase alternating-current circuit, a circuit breaker, electromagnetic means for controlling said circuit breaker including a plurality of phasing windings, phasing connections for said windings including a connection of one terminal of each of said windings to a corresponding conductor of said circuit, an impedance element connected to the remaining terminal of each of said windings and contact members for connecting the free terminals of said impedance elements together to produce a biasing action in said electromagnetic means.

2. In an automatic protector for controlling a grounded-neutral distribution circuit, a circuit breaker, means including an electromagnetic device for controlling said circuit breaker, said device having a phasing winding, phasing connections for said winding including a connection of one terminal thereof connected to a conductor of said circuit, an impedance element connected to the remaining terminal of said winding, and contact members for connecting the free terminal of said impedance element to ground to produce a biasing force in said device.

3. In an automatic protector for controlling a polyphase alternating-current circuit, a circuit breaker, electromagnetic means for controlling said circuit breaker including a plurality of phasing windings, phasing connections for said windings including a connection of one terminal of each of said windings to a corresponding conductor of said circuit, an impedance element connected to the remaining terminal of each of said windings and fault-responsive means for connecting the free terminals of said impedance elements together to produce a restraining force in said electromagnetic means during normal conditions of said circuit and for disconnecting said impedance elements to cause sensitive operation of said electromagnetic means during fault conditions.

4. In an automatic protector for controlling the connection and disconnection of a pair of distribution circuits, a circuit breaker, means including a relay for controlling said circuit breaker, said relay having a potential winding and a second winding in cooperative relationship therewith, a phasing impedance, a second impedance, electrical connections completing a phasing circuit effective when said circuit breaker is open, said phasing circuit including said second winding and said phasing impedance, and means for establishing a potentiometer connection of said impedance and said second winding to one of said circuits for producing a biasing force in said relay.

5. In an automatic protector for controlling the connection and disconnection of a pair of distribution circuits, a circuit breaker, means including a relay for causing said circuit breaker to open in response to predetermined voltage and current conditions of said circuits and for causing said circuit breaker to close in response to a predetermined relationship of voltages of said circuits, said relay having a potential winding and a second winding in cooperative relationship therewith, a phasing impedance, a second impedance, electrical connections completing a phasing circuit effective when said circuit breaker is open, said phasing circuit including said second winding and said phasing impedance, and means for establishing a potentiometer connection of said impedances and said second winding to one of said circuits for producing a biasing force in said relay to cause insensitive operation thereof.

6. In an automatic protector for controlling the connection and disconnection of a pair of distribution circuits, a circuit breaker, means including a relay for controlling said circuit breaker, said relay having a potential winding and a second winding in cooperative relationship therewith, a phasing impedance, a second impedance, electrical connections completing a phasing circuit effective when said circuit breaker is open, said phasing circuit including said second winding and said phasing impedance, means for establishing a potentiometer connection of said impedances and said second winding to one of said circuits for exerting a restraining force in said relay and means for rendering said last mentioned means effective during a closing operation of said circuit breaker and ineffective during an abnormal condition of one of said circuits.

7. In an automatic protector for controlling the connection and disconnection of a pair of distribution circuits, a circuit breaker, means including a relay for controlling said circuit breaker, said relay having a potential winding and a second winding in cooperative relationship therewith, a phasing impedance, a second impedance, electrical connections completing a phasing circuit effective when said circuit breaker is open, said phasing circuit including said second winding and said phasing impedance, means for establishing a potentiometer connection of said impedances and second winding to one of said circuits for exerting a restraining force in said relay and means for rendering said last-mentioned means effective during a closing operation of said circuit breaker and ineffective during an undervoltage condition of one of said circuits.

8. In an automatic protector for controlling the connection and disconnection of a pair of polyphase alternating-current circuits, a circuit breaker, means including an induction disc relay for controlling said circuit breaker, said relay having a potential winding and a second winding in cooperative relationship therewith, a phasing impedance, a second impedance, electrical connections completing a phasing circuit effective when said circuit breaker is open, said phasing circuit including said second winding and said phasing impedance, means for establishing a potentiometer connection of said impedances and said second winding to one of said circuits for exerting a restraining force in said relay and means responsive to a symmetrical component of polyphase voltage of one of said circuits for rendering said last-mentioned means effective during a closing operation of said circuit breaker and ineffective during an under-voltage condition of one of said circuits.

9. In an automatic protector for controlling the connection and disconnection of a pair of polyphase alternating-current circuits, a circuit breaker, means including an induction disc relay for controlling said circuit breaker, said relay having a potential winding and a second winding in cooperative relationship therewith, a phasing resistor, a second resistor, electrical connections completing a phasing circuit effective when said circuit breaker is open, said phasing circuit including said second winding and said phasing resistor, means for establishing a potentiometer connection of said resistors and said second winding to one of said circuits for exerting a restraining force in said relay, a phase-sequence network connected to one of said circuits, and a relay responsive to a symmetrical component of polyphase voltage supplied by said network for rendering said last-mentioned means effective during a closing operation of said circuit breaker and ineffective during an undervoltage condition.

10. In an automatic protector for controlling the connection and disconnection of a pair of distribution circuits, a circuit breaker, means including a relay for causing said circuit breaker to open in response to predetermined voltage and current conditions of said circuits and for causing said circuit breaker to close in response to a predetermined relationship of voltages of said circuits, restraining means for producing a restraining torque in said relay to cause insensitive operation thereof and means responsive to a voltage condition of one of said circuits for preventing closure of said circuit breaker when said voltage condition is below a predetermined value and for rendering said restraining means effective when said voltage condition exceeds said predetermined value.

11. In an automatic protector for controlling the connection and disconnection of a pair of polyphase alternating-current circuits, a circuit breaker, means including a relay for causing said circuit breaker to open in response to predetermined voltage and current conditions of said circuits and for causing said circuit breaker to close in response to a predetermined relationship of voltages of said circuits, restraining means for producing a restraining torque in said relay to cause insensitive operation thereof and means responsive to a symmetrical component of polyphase voltage of one of said circuits for preventing closure of said circuit breaker when said coming closure of said circuit breaker when said component is below a predetermined value and for rendering said restraining means effective when said component exceeds said predetermined value.

MYRON A. BOSTWICK.